United States Patent
Nawata et al.

(10) Patent No.: US 10,823,371 B2
(45) Date of Patent: Nov. 3, 2020

(54) OPTICAL DEVICE AND OPTICAL SYSTEM APPARATUS

(71) Applicant: SCIVAX CORPORATION, Kanagawa (JP)

(72) Inventors: Akifumi Nawata, Kanagawa (JP); Nobuyoshi Awaya, Kanagawa (JP); Satoru Tanaka, Kanagawa (JP)

(73) Assignee: SCIVAX CORPORATION, Kanagawa (JP)

( * ) Notice: Subject to any disclaimer, the term of this patent is extended or adjusted under 35 U.S.C. 154(b) by 0 days.

(21) Appl. No.: 16/305,940

(22) PCT Filed: Apr. 2, 2018

(86) PCT No.: PCT/JP2018/014167
§ 371 (c)(1),
(2) Date: Nov. 30, 2018

(87) PCT Pub. No.: WO2018/207501
PCT Pub. Date: Nov. 15, 2018

(65) Prior Publication Data
US 2020/0056759 A1    Feb. 20, 2020

(30) Foreign Application Priority Data

May 11, 2017   (JP) ................................. 2017-094935
Dec. 14, 2017  (JP) ................................. 2017-239916

(51) Int. Cl.
*F21V 5/04*   (2006.01)
*F21V 7/00*   (2006.01)
(Continued)

(52) U.S. Cl.
CPC ............ *F21V 5/048* (2013.01); *F21V 7/0091* (2013.01); *F21V 7/06* (2013.01); *F21Y 2115/10* (2016.08)

(58) Field of Classification Search
CPC .......... F21V 5/048; F21V 7/0091; F21V 7/06; F21Y 2115/10
See application file for complete search history.

(56) References Cited

U.S. PATENT DOCUMENTS

2005/0168995 A1   8/2005   Kittlemann et al.
2010/0135036 A1   6/2010   Matsuba
(Continued)

FOREIGN PATENT DOCUMENTS

JP   H05-281402   10/1993
JP   2002-221605   8/2002
(Continued)

OTHER PUBLICATIONS

Unpublished U.S. Appl. No. 16/305,956, filed by Applicant Nov. 30, 2018.

*Primary Examiner* — Anabel Ton
(74) *Attorney, Agent, or Firm* — Schroeder Intellectual Property Law Group, LLC (57) ABSTRACT

An optical device including at least a part of a rotation body acquired by rotating a reference plane shape or a parallelly shifted body acquired by parallelly shifting the reference plane shape, the reference plane shape including an incidence portion allowing light from a predetermined site to enter, an emit portion that reflects the light which has traveled through the incidence portion and which is directly irradiated and a first reflection portion that reflects the reflected light by the emit portion toward the emit portion. The reference plane shape may include a second reflection portion that reflects the light which has traveled through the incidence portion and which is directly irradiated to the emit portion. An optical system apparatus includes a light source placed at the predetermined site.

14 Claims, 11 Drawing Sheets

(51) Int. Cl.
*F21V 7/06* (2006.01)
*F21Y 115/10* (2016.01)

(56) References Cited

U.S. PATENT DOCUMENTS

| | | | |
|---|---|---|---|
| 2011/0261570 A1* | 10/2011 | Okada | F21S 43/14 |
| | | | 362/311.06 |
| 2013/0235590 A1 | 9/2013 | Van Der Sijde et al. | |
| 2014/0036510 A1 | 2/2014 | Preston et al. | |
| 2016/0033108 A1* | 2/2016 | Ji | H05B 33/0803 |
| | | | 315/297 |
| 2016/0076739 A1* | 3/2016 | Hsiao | G02B 19/0061 |
| | | | 362/299 |
| 2016/0123554 A1* | 5/2016 | Kang | G02F 1/133606 |
| | | | 362/97.1 |
| 2016/0201875 A1* | 7/2016 | Kang | G02B 19/0014 |
| | | | 362/311.06 |

FOREIGN PATENT DOCUMENTS

| | | |
|---|---|---|
| JP | 2005-235744 | 9/2005 |
| JP | 2010-212021 | 9/2010 |
| JP | 2013-251105 | 12/2013 |
| JP | 2014-003168 | 1/2014 |
| JP | 2014-502022 | 1/2014 |
| JP | 2014-135172 | 7/2014 |
| JP | 2015-529849 | 10/2015 |
| WO | 2016/190719 | 12/2016 |

* cited by examiner

OPTICAL DEVICE AND OPTICAL SYSTEM APPARATUS

RELATED APPLICATIONS

The present application is a national phase application of International Patent Application No. PCT/JP2018/014167, filed Apr. 2, 2018, which claims the filing benefit of Japanese Patent Application No. 2017-094935, filed May 11, 2017, and Japanese Patent Application No. 2017-239916, filed Dec. 14, 2017—the contents of all of which are incorporated herein by reference.

TECHNICAL FIELD

The present disclosure relates to an optical device and an optical system apparatus that utilizes the same.

BACKGROUND ART

In recent years, LEDs are applied as illumination light sources. According to this trend, a development for an optical system apparatus that guides light forwardly without a waste is advancing. For example, an optical device that includes a refraction lens portion and a plurality of reflector portions has been proposed (see, for example, Patent Document 1).

CITATION LIST

Patent Literatures

Patent Document 1: JP H05-281402 A

SUMMARY OF INVENTION

Technical Problem

However, the above described optical device has a large number of concavo-convex structures, and thus the structure is complicated and the manufacturing is not simple.

Accordingly, an objective of the present disclosure is to provide an optical device which is easy to manufacture and which is capable of guiding light forwardly without a waste, and an optical system apparatus utilizing the same.

Solution to Problem

An optical device according to the present disclosure includes at least a part of a rotation body acquired by rotating a reference plane shape or a parallelly shifted body acquired by parallelly shifting the reference plane shape, in which the reference plane shape includes:

an incidence portion allowing light from a predetermined site to enter;

an emit portion that reflects the light which has traveled through the incidence portion and which is directly irradiated; and a first reflection portion that reflects the reflected light by the emit portion toward the emit portion.

In this case, it is preferable that the incidence portion should be a circular arc around the predetermined site. Moreover, in this case, it is preferable that the emit portion should be a parabola having the predetermined site being as a focal point.

The first reflection portion may be in a shape that reflects the light in such a way that a refraction direction at the emit portion becomes a direction of a shortest straight line that interconnects the predetermined site with the emit portion.

The first reflection portion may also be in a shape that reflects the light in such a way that a refraction direction at the emit portion becomes a direction for concentrating light to a predetermined light concentration site.

It is preferable that the first reflection portion should be in a shape for performing total reflection on the light which has traveled through the incidence portion and which is reflected by the emit portion, but may utilize metal reflection.

The reference plane shape may further include a second reflection portion that reflects the light which has traveled through the incidence portion and which is directly irradiated to the emit portion.

The second reflection portion may be in a shape that reflects the light in such a way that a refraction direction at the emit portion becomes a direction of a shortest straight line that interconnects the predetermined site with the emit portion.

The second reflection portion may also be in a shape that reflects the light in such a way that a refraction direction at the emit portion becomes a direction for concentrating light to a predetermined light concentration site.

It is preferable that the second reflection portion should be in a shape for performing total reflection on the light which has traveled through the incidence portion but may utilize metal reflection.

The reference plane shape may further include a connection portion between the first reflection portion and the second reflection portion, and a joint portion to fasten the optical device at an arbitrary location may be formed on at least apart of a surface formed by the connection portion.

A reflection prevention film may be formed on either one of or both of a surface formed by the incidence portion and a surface formed by the emit portion.

An optical system apparatus according to the present disclosure includes:

the above-described optical device; and a light source placed at the predetermined site.

In this case, the light source may be embedded in the incidence portion.

When the incidence portion is a circular arc around the predetermined site, it is preferable that a radius of the circular arc should be equal to or greater than four times as much as a maximum radius of the light source.

A mirror may be placed at a side of the light source facing with the optical device. In this case, it is preferable that the mirror should be formed in a spherical shape that reflects incident light from the light source to an incidence direction.

Advantageous Effects of Invention

According to the present disclosure, since the optical device employs a structure that has less concavities and convexities, the optical device can be easily manufactured by, for example, injection molding.

DESCRIPTION OF EMBODIMENTS

An optical device according to the present disclosure will be described below.

An optical device 10 according to the present disclosure is a rotation body (see FIG. 2 and FIGS. 3A and 3B) obtained by rotating a plane shape for reference (a reference plane shape 1 below, see FIG. 1) or a parallelly shifted object (see FIGS. 4 to 6) obtained by parallelly such a reference plane, and controls incident light. The optical device 10 may include at least a part of the rotation body of the reference plane shape 1 or the parallelly shifted body thereof. When, for example, the optical device 10 is formed by injection molding, since a gate that is a port of filling a resin is necessary, a cut surface which separates the gate is formed on a finished product, but the optical device 10 according to the present disclosure also includes a structure that has such a cut surface.

The material of the optical device 10 is any material that is transparent with respect to light to be controlled, and for example, a transparent dielectric is applicable. More specifically, inorganic substances like glass, and resins like cyclo-olefin polymer (COP) are the examples of the material.

Figure 1:
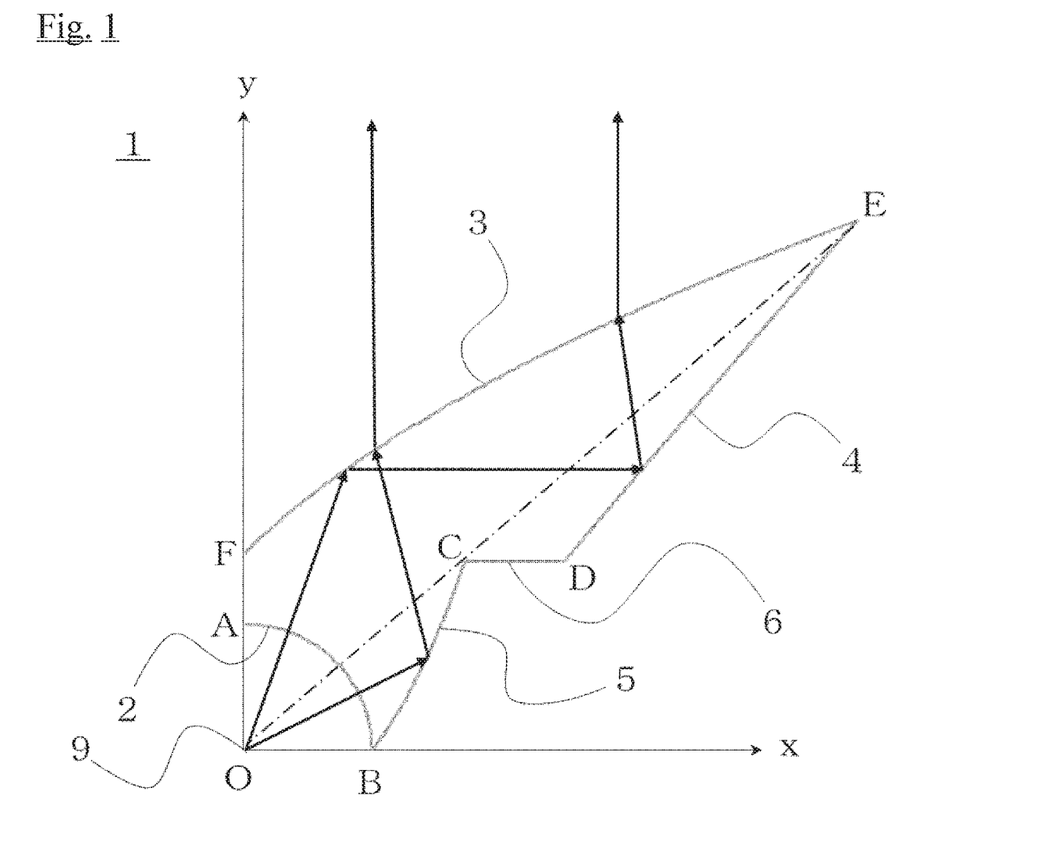
FIG. 1 is a diagram illustrating a reference plane shape relating to an optical device according to the present disclosure.

As illustrated in FIG. 1, the reference plane shape 1 includes has an incidence portion 2 allowing light to enter at least from a predetermined site 9, an emit portion 3 that reflects the light which has traveled through the incidence portion 2 and which is directly irradiated, and a first reflection portion 4 that reflects the light reflected by the emit portion toward the emit portion. Note that in FIG. 1, for the purpose of description, the predetermined site 9 is defined as an origin O, and the right direction from the origin O in the paper plane is defined as an x-axis, the upward direction is defined as a y-axis, and the depthwise direction is defined as a z-axis.

The incidence portion 2 may be in any shape as long as light can enter from the predetermined site 9, but a shape that does not reflect the light from the predetermined site 9 as much as possible is preferable. Hence, it is preferable that the shape of the incidence portion 2 should be a circular arc around the predetermined site 9. This causes the light from the predetermined site 9 to vertically enter the incidence portion 2, and thus the reflection is suppressed at maximum.

Figure 7:
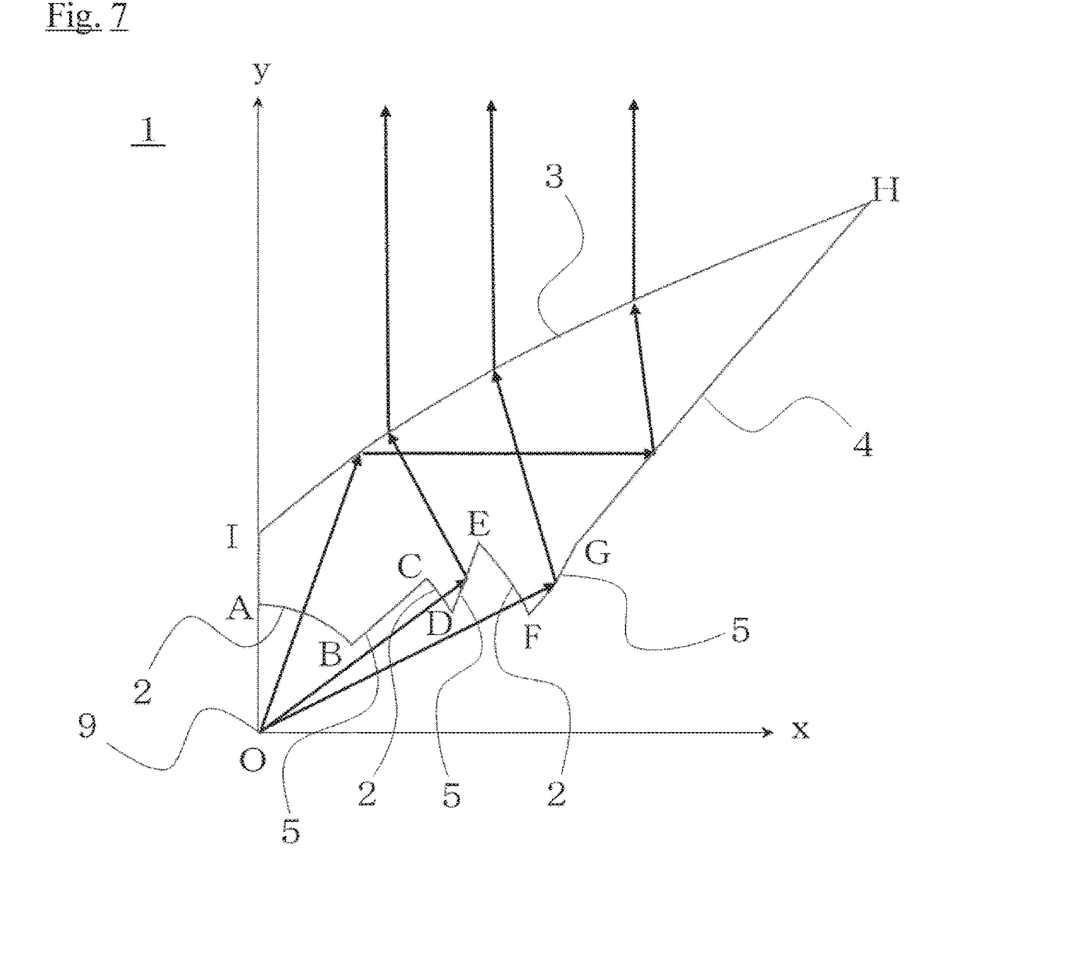
FIG. 7 is a diagram illustrating a reference plane shape relating to another optical device according to the present disclosure.

Moreover, when the circular-arc incidence portion 2 is adopted, since the larger the radius of the circular arc is, the more a light source placed at the predetermined site 9 approximates a dot light source, the error decreases, thus preferable. More specifically, it is preferable that the radius of the circular arc should be equal to or greater than four times, more preferably, equal to or greater than 10 times, and further preferably, equal to or greater than 100 times as much as the maximum radius of the light source placed at the predetermined site 9 (the dimension of the portion most apart from the predetermined site 9 in the external shape of the light source). Furthermore, since light that has a large output angle has a short optical path length, an error increases. Accordingly, as illustrated in FIG. 7, the incidence portion 2 may be formed by a plurality of circular arcs having different radii in such a way that the greater the output angle of light is, the larger the circular arc of the incidence portion 2 becomes.

The emit portion 3 is a part where incident light to the optical device 10 from the predetermined site 9 is eventually emitted, and is formed in a shape that reflects light which has traveled through the incidence portion 2 and which is directly irradiated. The emit portion 3 may be in any shape as long as the above-described condition is satisfied, but when, for example, the incidence portion 2 is a circular arc around the predetermined site 9, the shape of such emit portion may be a parabola that has the predetermined site 9 as a focal point. This causes all incident light from the predetermined site 9 to travel straightly through the incidence portion 2 and to be reflected in the x-axis direction at the emit portion 3, and thus there is an advantage such that calculation of an optical path is facilitated. Note that in order to control the directions of all light to be emitted, it is preferable that the emit portion 3 should be in a shape for total reflection on light that has traveled through the incidence portion 2 and directly emitted.

Figure 2:
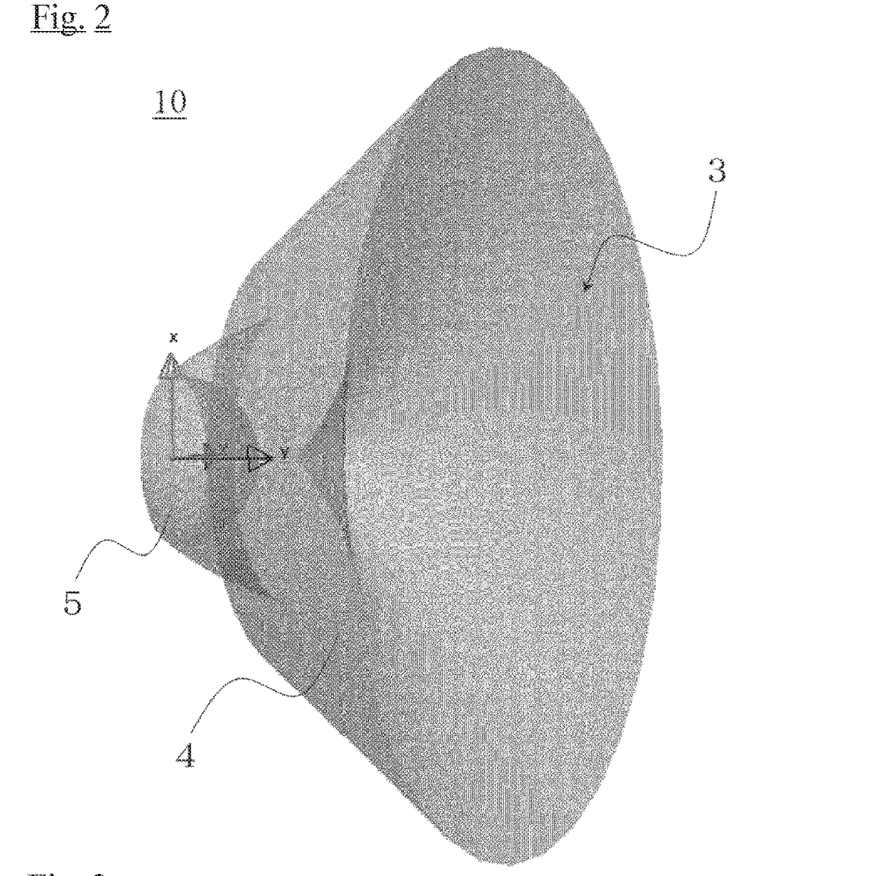
FIG. 2 is a perspective view illustrating an optical device (rotation body) according to the present disclosure.

The first reflection portion 4 may be in any shape as long as the light reflected by the emit portion 3 is reflected to the emit portion 3, but a shape that causes the light to be reflected to have an angle refracted in a predetermined direction at the emit portion 3 is preferable. For example, the first reflection portion 4 may be in a shape that reflects light in such a way that the refraction direction at the emit portion 3 becomes a direction of the shortest straight line (a straight line OF in FIG. 1) which interconnects the predetermined site 9 with the emit portion 3, i.e., the y-axis direction. Moreover, as illustrated in FIG. 2, the first reflection portion 4 may also be in a shape that reflects light in such a way that the refraction direction at the emit portion 3 becomes a direction which concentrates lights at a predetermined light concentration site 95.

Although the first reflection portion 4 may utilize metal reflection, a loss due to absorption of light energy occurs. Therefore, it is preferable that the reflection portion 4 should be for total reflection on the light reflected by the emit portion 3. The first reflection portion 4 that causes the incidence angle of light reflected by the emit portion 3 to be equal to or greater than a critical angle. When, for example, the transparent dielectric that forms the optical device 10 is cyclo-olefin polymer (COP), since an index of refraction is 1.41, the critical angle becomes substantially 45 degrees.

Moreover, when an output angle of the light source is larger than a straight line that interconnects the outermost part of the emit portion 3 with the predetermined site 9 (light source location), the reference plane shape 1 may further include a second reflection portion 5.

Figure 8:
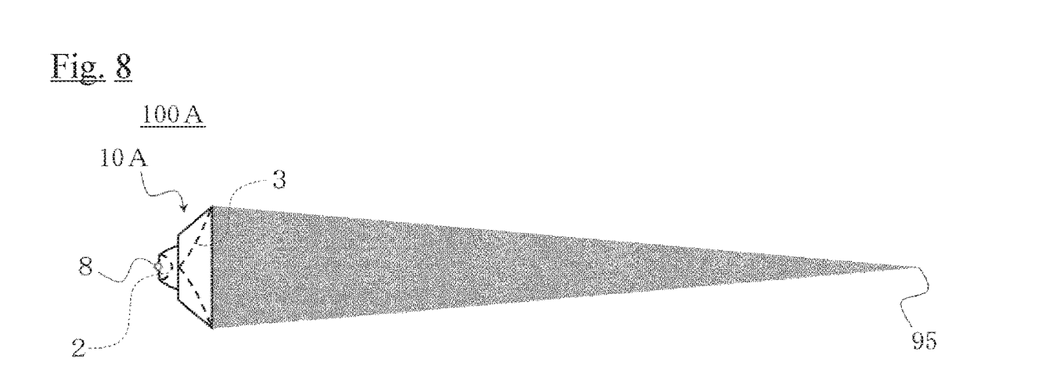
FIG. 8 is a side view for explaining a light condensing type optical system apparatus according to the present disclosure.

The second reflection portion 5 may be formed in any shape as long as it reflects light that has traveled through the incidence portion 2 from the predetermined site 9 to the emit portion 3, but preferably, a shape is preferable which causes light to be reflected to have an angle refracted in a predetermined direction at the emit portion 3. For example, the second reflection portion 5 may be in a shape that reflects light in such a way that a refraction direction at the emit portion 3 becomes the direction of the shortest straight line (a straight line OF in FIG. 1) that interconnects the predetermined site 9 with the emit portion 3, i.e., the y-axis direction. Moreover, as illustrated in FIG. 8, the second reflection portion 5 may also be in a shape that reflects light in such a way that the refraction direction at the emit portion 3 becomes a direction which concentrates lights at the predetermined light concentration site 95.

Moreover, in the reference plane shape 1 illustrated in FIG. 1, a connection portion 6 between the first reflection portion 4 and the second reflection portion 5 may be formed in a shape that does not disrupt an optical path in the optical device 10. In this case, a surface formed by the connection portion 6 may have at least partially a joint portion for fastening the optical device 10 to an arbitrary location. As for a joint portion, chemical joining using an adhesive, etc., or physical joining like screws, etc., is applicable. The joint portion formed in this way does not affect the optical path of the optical device 10 according to the present disclosure, and has an advantage such that light is not wasted.

Note that a conventionally well-known reflection prevention film may be formed on either one of or both of the surface formed by the incidence portion and the surface formed by the emit portion.

Figure 9:
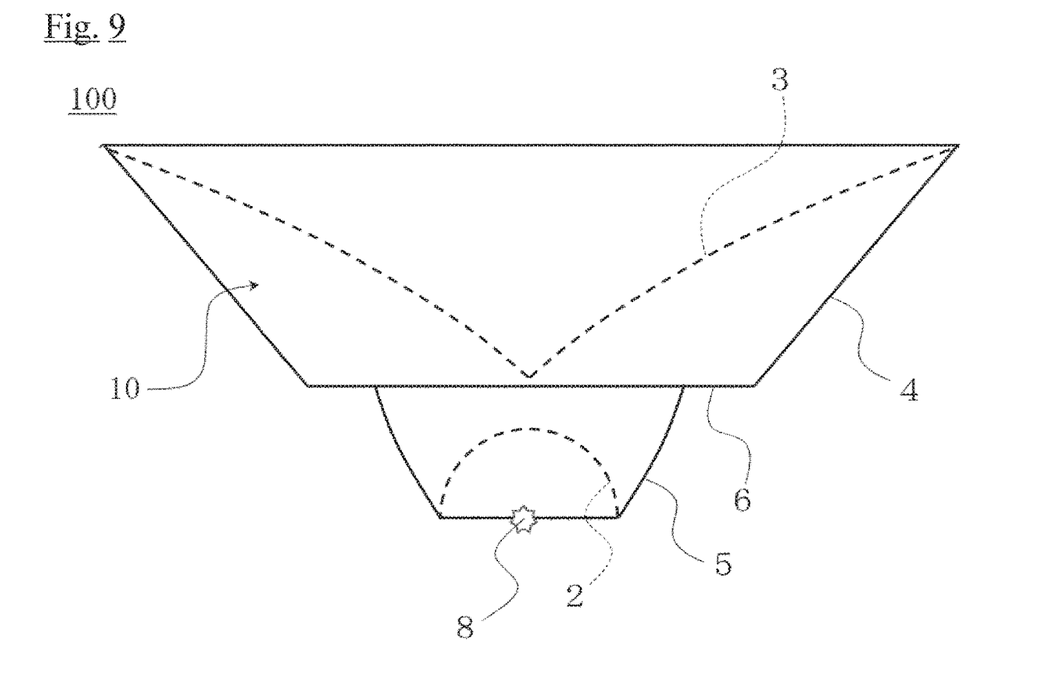
FIG. 9 is a side view for explaining the optical system apparatus according to the present disclosure.

Moreover, as illustrated in FIG. 9, an optical system apparatus 100 according to the present disclosure includes the above-described optical device 10 according to the present disclosure, and alight source 8 placed at the predetermined site 9 in the optical device 10.

A light source is not limited to any particular one as long as it produces light, but a dot light source or a linear light source that have light spreading radially are suitably applicable. More specifically, an LED, incandescent lamp, a fluorescent light, etc., are applicable.

Moreover, when the circular-arc incidence portion 2 is adopted, since the larger the radius of the circular arc is, the more the light source 8 placed at the predetermined site 9 approximates a dot light source, the error decreases, thus preferable. More specifically, it is preferable that the radius of the circular arc should be equal to or greater than four times, more preferably, equal to or greater than 10 times, and further preferably, equal to or greater than 100 times as much as the maximum radius of the light source 8 placed at the predetermined site 9 (the dimension of the portion most apart from the predetermined site 9 in the external shape of the light source).

Figure 10:
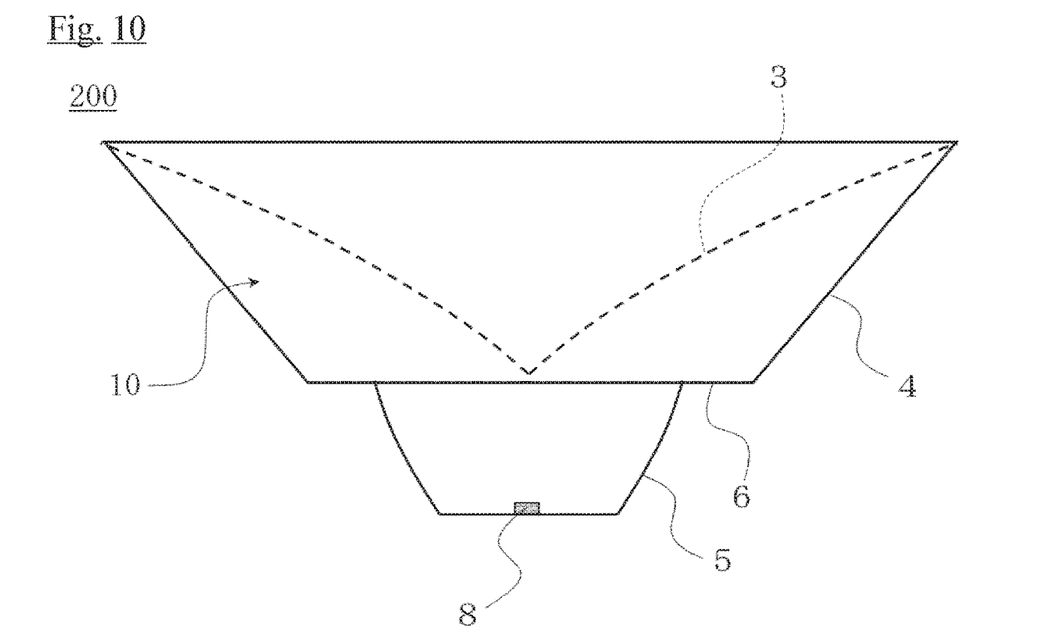
FIG. 10 is a side view for explaining another optical system apparatus according to the present disclosure.
Figure 11:
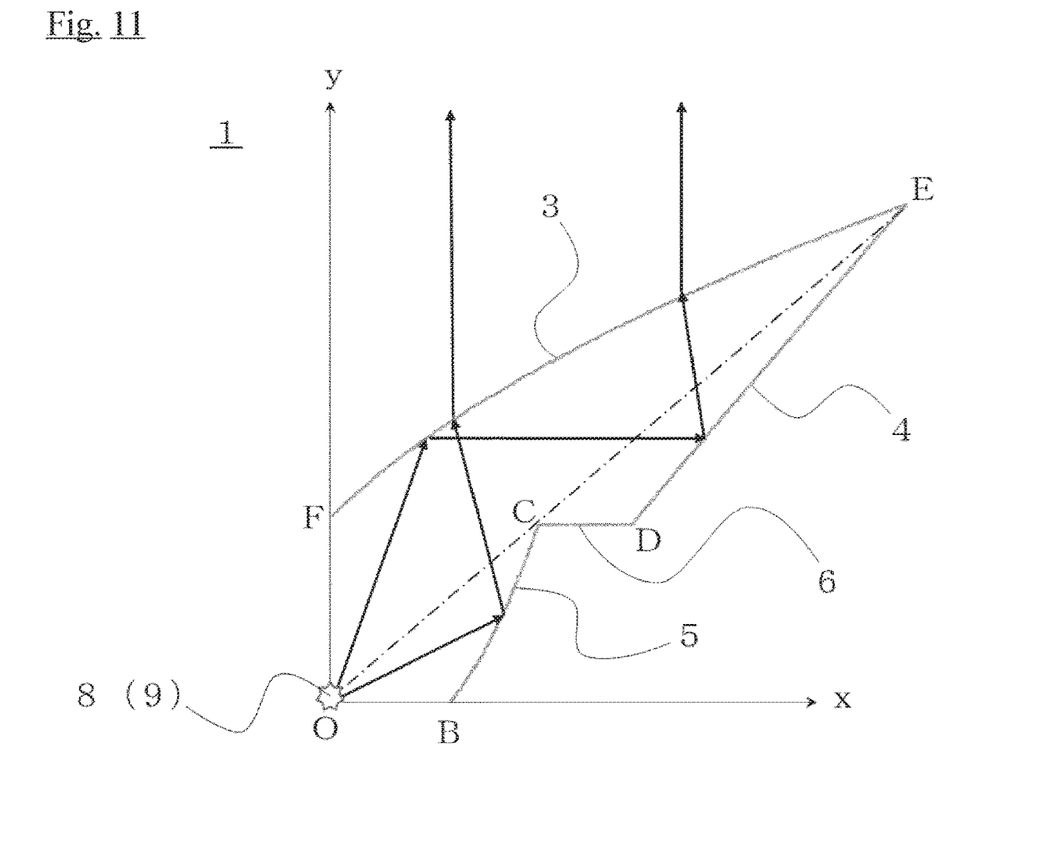
FIG. 11 is a diagram illustrating a reference plane shape relating to another optical device according to the present disclosure.

Moreover, as illustrated in FIG. 10, an optical system apparatus 200 that has the light source 8 embedded in the predetermined site 9 of the above-described optical device 10 of the present disclosure may be adopted. In this case, when the material for embedding is a material that has a similar index of refraction as those of the material of the optical device 10 and of the material that forms the surface of the light source 8, reflection of light at the incidence portion 2 can be prevented or suppressed (see FIG. 11). More specifically, it is preferable that a difference in index of refraction between the material for embedding and the material of the optical device 10 and the material that forms the surface of the light source 8 should be less than 10%, preferably, consistent with each other.

Figure 12:
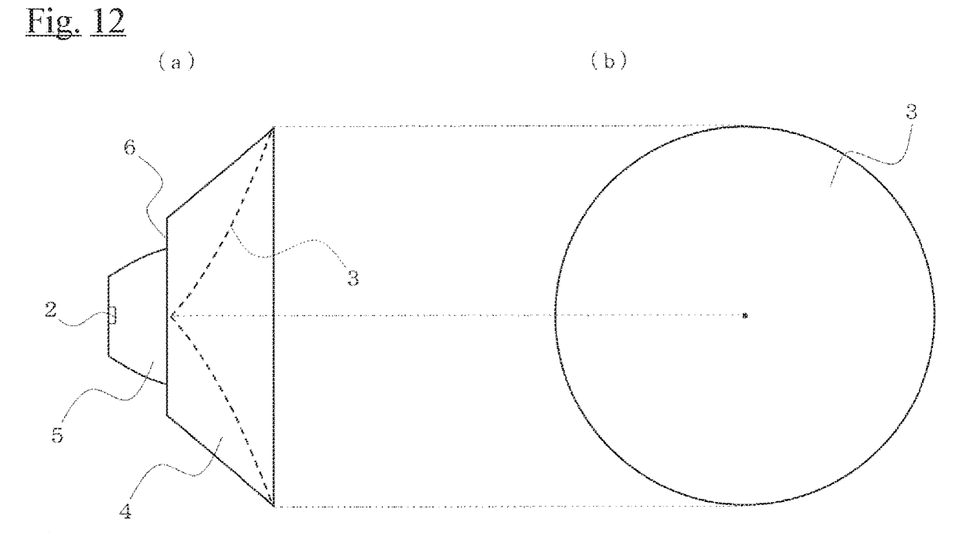
FIG. 12A is a side view and FIG. 12B is a plan view both illustrating another optical device (rotation body) according to the present disclosure.
Figure 13:
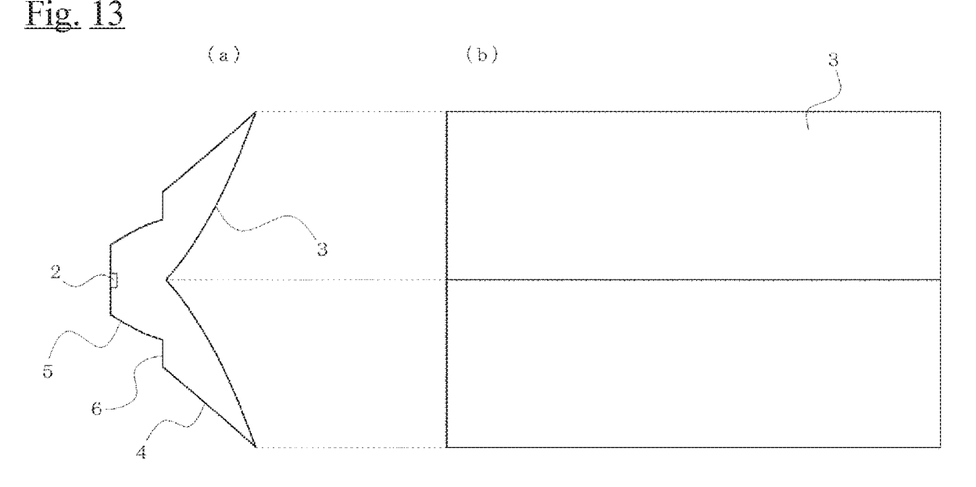
FIG. 13A is a side view and FIG. 13B is a plan view both illustrating another optical device (parallelly shifted body) according to the present disclosure.

The incidence portion 2 of the optical device 10 applied for the optical system apparatus 200 may be in a shape that facilitates embedding of the light source 8. For example, as illustrated in FIG. 12 and in FIG. 13, the incidence portion 2 may be formed as a recess in the same shape as the light source 8.

Moreover, the optical system apparatuses 100 and 200 may include a mirror placed at a side of the light source 8 facing with the optical device 10. In this case, it is preferable that the mirror should be formed in a spherical shape that reflects incident light from the light source 8 in the incidence direction. Accordingly, light emitted to a side of the light source 8 where no optical device 10 is present is also effectively utilized.

Figure 3:
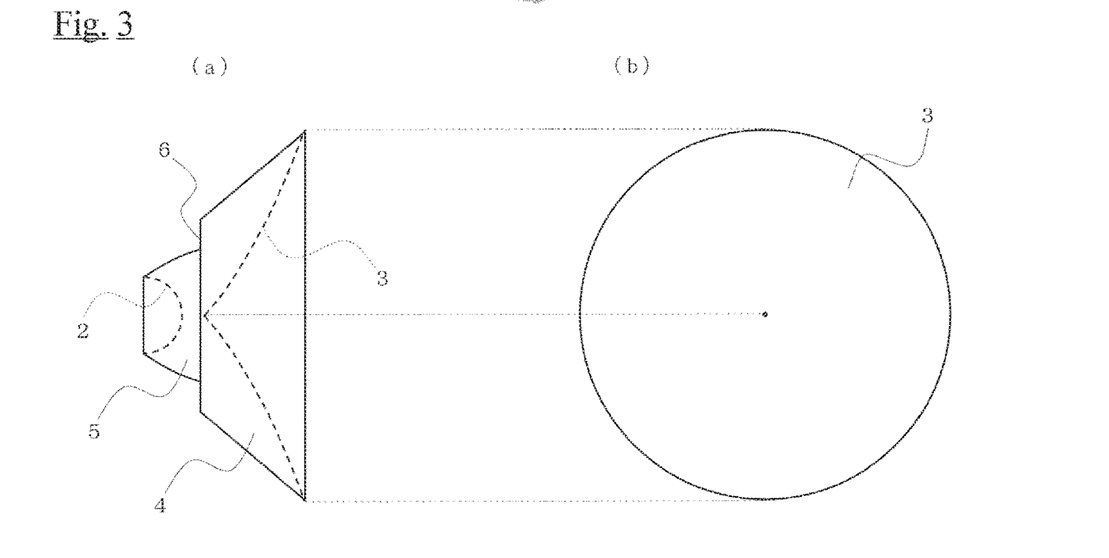
FIG. 3A is a side view and FIG. 3B is a plan view both illustrating the optical device (rotation body) according to the present disclosure.
Figure 4:
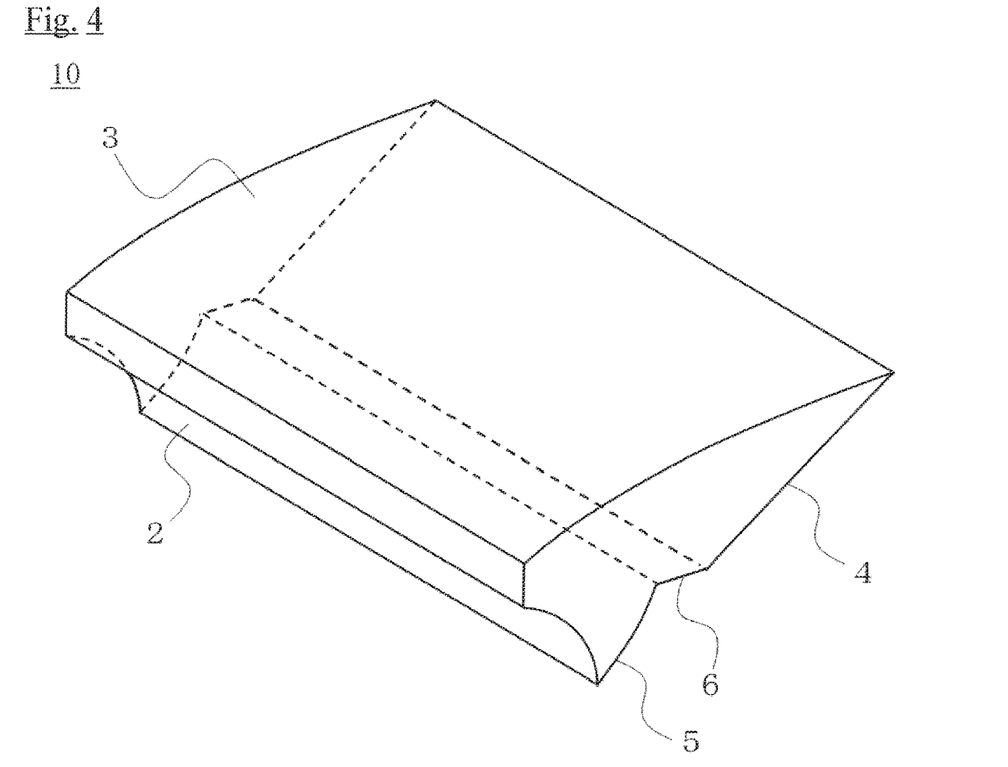
FIG. 4 is a perspective view illustrating an optical device (parallelly shifted body) according to the present disclosure.
Figure 5:
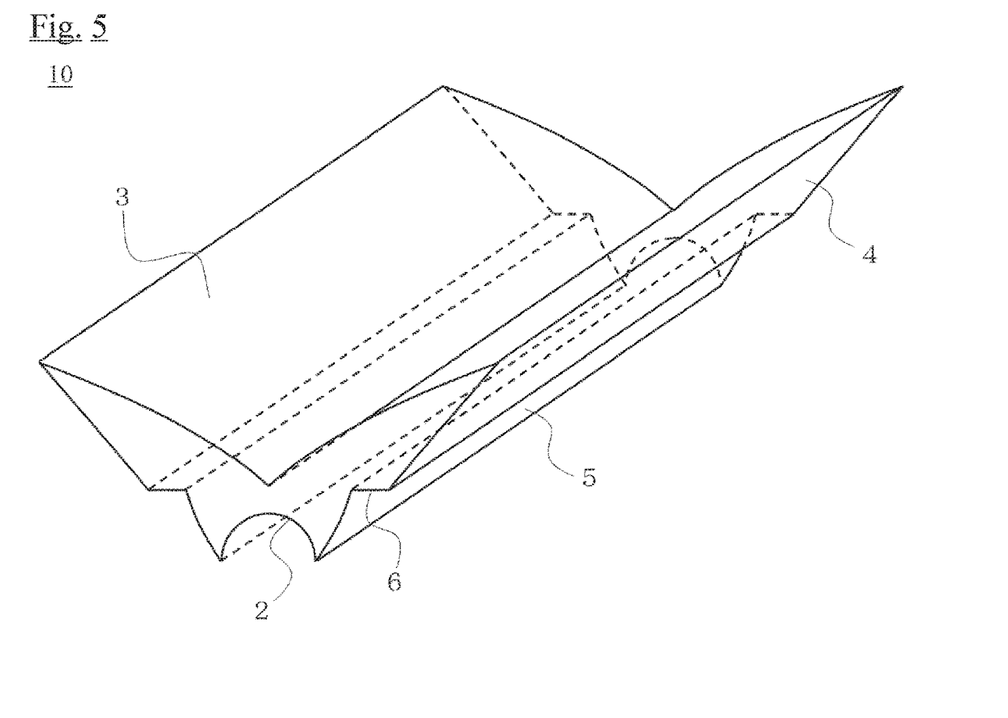
FIG. 5 is a perspective view illustrating another optical device (parallelly shifted body) according to the present disclosure.
Figure 6:
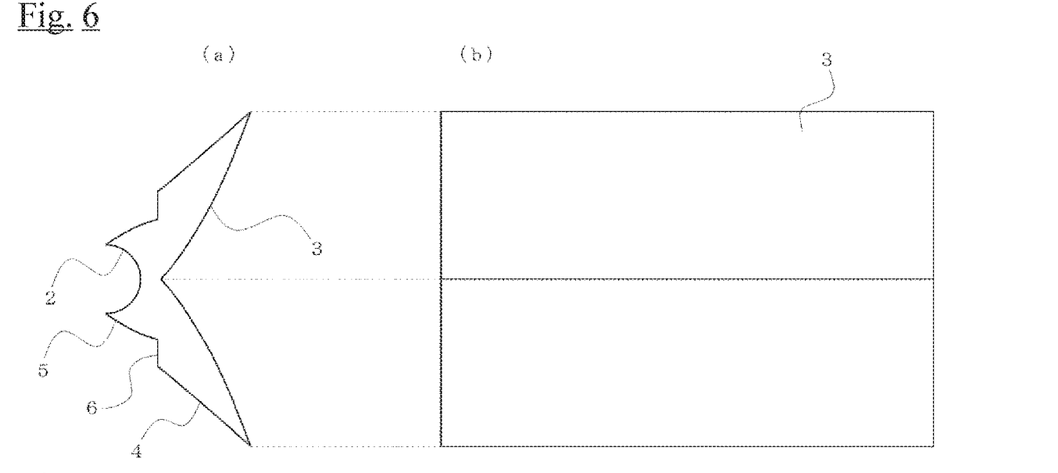
FIG. 6A is a side view and FIG. 6B is a plan view both illustrating the optical device (parallelly shifted body) according to the present disclosure.

Next, examples of the optical device 10 according to the present disclosure will be described. The optical device 10 according to the present disclosure may be formed as (1) a rotation body that has the reference plane shape 1 rotated around a center line that is a straight line passing through a predetermined site as illustrated in FIG. 2 and FIGS. 3A and 3B, and (2) a shape that has the reference plane shape 1 parallelly shifted in the normal direction of the reference plane shape 1 as illustrated in FIGS. 4 to 6. In inverse expressions, in the rotation body of (1), a cross-section that includes the center line is in the same shape as the reference plane shape 1. Moreover, in the parallelly shifted body of (2), a cross-section that is an orthogonal plane to the parallelly shifted direction is the same shape as the reference plane shape 1.

First, a first example will be described which is the reference plane shape 1 of the optical device 10 that emits incident light from a predetermined site as parallel light to the y-axis direction. This reference plane shape 1 includes the incidence portion 2, the emit portion 3, the first reflection portion 4, the second reflection portion 5, and the connection portion 6. Formation scheme of this reference plane shape 1 is as follow.

First, as the incidence portion 2, a circular arc which has a center O, and a straight line OA as a radius r is formed. Such a circular arc can be expressed by the following formula.

$$x^2+y^2=r^2 \qquad \text{[Formula 1]}$$

Next, as the emit portion 3, a parabola EF that has the point O as a focal point is formed. An outermost part E can be designed freely in accordance with an application. When a distance (focal distance) between the vertex of the parabola and the focal point is f, the parabola can be expressed by the following formula.

$$x = \frac{y^2}{4f} = f \quad \text{[Formula 2]}$$

Next, as the second reflection portion 5, a curved line BC is formed. The shape of the curved line BC can be designed in such a way that light reflected at an arbitrary point on the curved line BC is refracted in the y-axis direction at the emit portion 3. More specifically, the reflection direction at the arbitrary point on the curved line BC can be calculated from a fact such that an incidence angle becomes consistent with a reflection angle on a tangent line at such a point. Hence, a design can be made which causes the reflected light to travel toward a location where the light becomes parallel to the y-axis direction by refraction on the parabola EF. As for this calculation, an analysis method like Newton-Raphson scheme is applicable. Moreover, this calculation can be carried out using a computer.

Next, the first reflection portion 4 is formed as a curved line DE. The formation direction of the shape is defined as being from E to D. The shape of the curved line DE can be designed in such a way that light reflected at an arbitrary point on the curved line DE is refracted in the y-axis direction at the emit portion. More specifically, the reflection direction at the arbitrary point on the curved line DE can be calculated from a fact such that an incidence angle becomes consistent with a reflection angle on a tangent line at such a point. Hence, a design can be made which causes the reflected light to travel toward a location where the light becomes parallel to the y-axis direction by refraction on the parabola EF. As for this calculation, an analysis method like Newton-Raphson scheme is applicable. Moreover, this calculation can be carried out using a computer.

Finally, the connection portion 6 is formed as CD. The CD portion can be in any shape as long as it does not disrupt an optical path, and according to the first example (FIG. 1), a straight line parallel to the x-axis direction is formed.

By rotating the reference plane shape 1 formed as described above around the y-axis direction, the optical device 10 according to the first example becomes as a rotation body as illustrated in FIG. 2.

Moreover, the optical device according to the present disclosure can also be a parallelly shifted body as illustrated in FIG. 4, by shifting the reference plane shape 1 parallel to the z-axis direction. In this case, it is preferable that the optical device 10 should have the reference plane shape 1 which is mirror symmetrical with reference to the y-axis direction as illustrated in FIG. 5 and FIG. 6.

Figure 14:
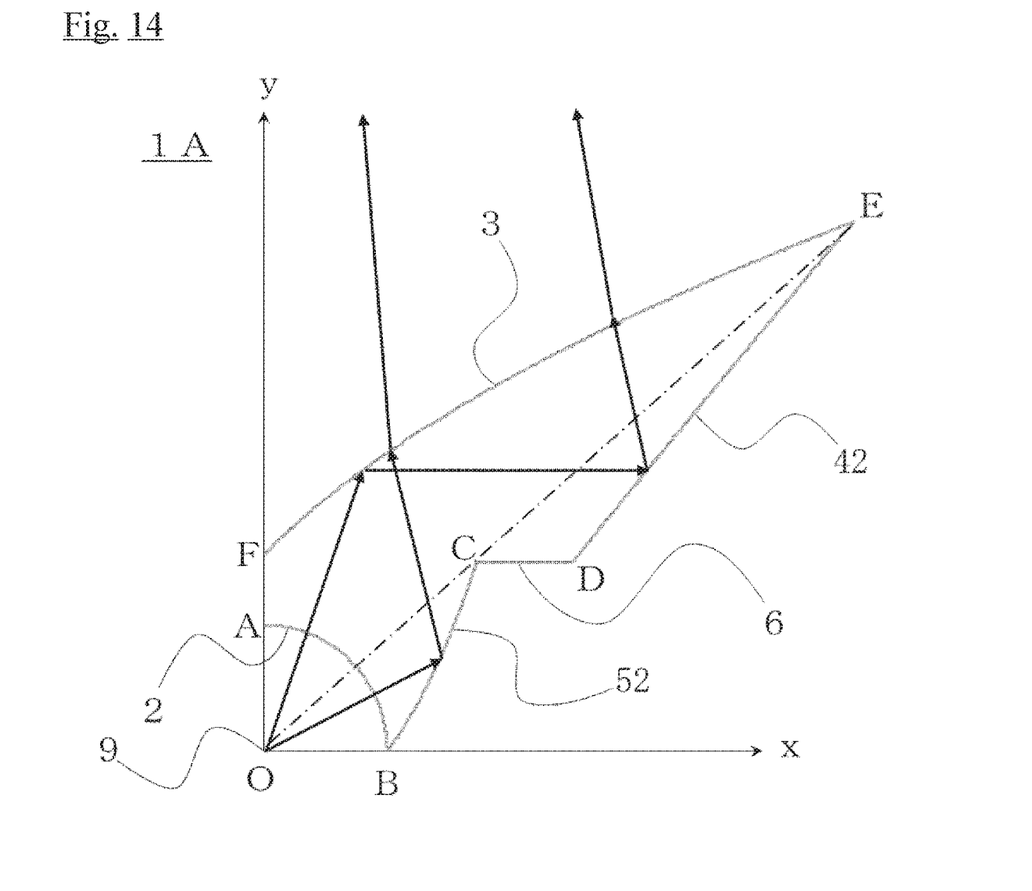
FIG. 14 is a diagram illustrating a reference plane shape relating to a light condensing type optical device according to the present disclosure.

Moreover, as a second example, as illustrated in FIG. 8, a reference plane shape 1A of the optical device 10 that emits incident light from the predetermined site 9 so as to be concentrated at a predetermined light concentration site 95. As illustrated in FIG. 14, this reference plane shape 1A includes the incidence portion 2, the emit portion 3, a first reflection portion 42, a second reflection portion 52, and the connection portion 6. The formation scheme of the reference plane shape 1A is as follow.

First, like the first example, as the incidence portion 2, a circular arc which has the center O, and the straight line OA as a radius r is formed. Such a circular arc can be expressed by the following formula.

$$x^2 + y^2 = r^2 \quad \text{[Formula 3]}$$

Next, as the emit portion 3, the parabola EF that has the point O as a focal point is formed. The outermost part E can be designed freely in accordance with an application. When a distance (focal distance) between the vertex of the parabola and the focal point is f, the parabola can be expressed by the following formula.

$$x = \frac{y^2}{4f} = f \quad \text{[Formula 4]}$$

Next, as the second reflection portion 52, the curved line BC is formed. The shape of the curved line BC can be designed in such a way that light reflected at an arbitrary point on the curved line BC is refracted in the direction for the light concentration site 95 at the emit portion 3. More specifically, the reflection direction at the arbitrary point on the curved line BC can be calculated from a fact such that an incidence angle becomes consistent with a reflection angle on a tangent line at such a point. Hence, a design can be made which causes the reflected light to travel toward the predetermined light concentration site 95 by refraction on the parabola EF. As for this calculation, an analysis method like Newton-Raphson scheme is applicable. Moreover, this calculation can be carried out using a computer.

Next, the first reflection portion 42 is formed as the curved line DE. The formation direction of the shape is defined as being from E to D. The shape of the curved line DE can be designed in such a way that light reflected at an arbitrary point on the curved line DE is refracted in the direction toward the predetermined light concentration site 95 at the emit portion 3. More specifically, the reflection direction at the arbitrary point on the curved line DE can be calculated from a fact such that an incidence angle becomes consistent with a reflection angle on a tangent line at such a point. Hence, a design can be made which causes the reflected light to travel toward the predetermined light concentration site 95 by refraction on the parabola EF. As for this calculation, an analysis method like Newton-Raphson scheme is applicable. Moreover, this calculation can be carried out using a computer.

Finally, the connection portion 6 is formed as CD. The CD portion can be in any shape as long as it does not disrupt an optical path, and according to the second example (FIG. 14), a straight line parallel to the x-axis direction is formed.

By rotating the reference plane shape 1 formed as described above around the y-axis direction, the optical device 10A according to the second example becomes as a rotation body as illustrated in FIG. 8.

Moreover, when the reference plane shape 1 is parallelly shifted in the z-axis direction, the optical device according to the present disclosure can be a parallelly shifted body. In this case, it is preferable that the optical device 10 should have the reference plane shape 1 mirror symmetrical with reference to the y-axis direction.

Next, an illuminance distribution when light is controlled using the optical system apparatus according to the present disclosure was checked by simulation. An optical simulation software Light Tools (available from Synopsys, Inc.) was applied for the simulation.

First Simulation

Figure 15:
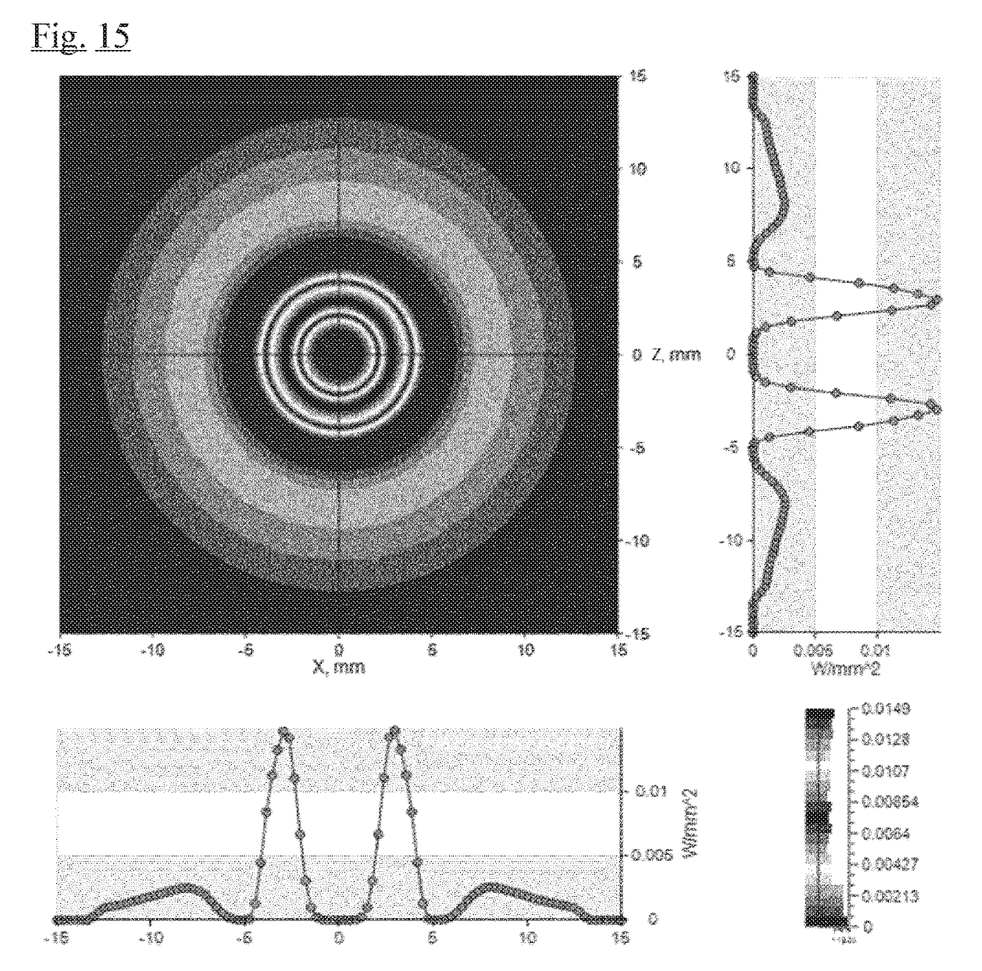
FIG. 15 is a diagram illustrating an illuminance distribution of the optical system apparatus according to the present disclosure.

First of all, an illuminance distribution when light is controlled using the optical system apparatus 100 illustrated FIG. 9 was simulated. In this case, the applied optical device 10 was a rotation body acquired by rotating the reference plane shape 1 illustrated in FIG. 1 as illustrated in FIG. 2 and FIG. 3, and emitted incident light from the predetermined site 9 as parallel light to the y-axis direction. A distance from the predetermined site 9 of the optical device 10 to the incidence portion 2 (radius OB) was set to be 2.67 mm. Moreover, a thickness of the optical device 10 (a distance between the x-axis and the point E) was set to be 11.2 mm. A radius of the optical device 10 (a distance between the y-axis and the point E) was set to be 12.9 mm. The assumed light source 8 placed at the predetermined site 9 had a diameter of 0.01 mm and emitted light in a lumber-cyanogen light distribution with an emission power of 1 W. The illuminance distribution at a location apart from the emit portion 3 by 50 mm was calculated. The simulation result is illustrated in FIG. 15. As is clear from FIG. 15, the illuminance distribution is substantially equivalent to the radius of the optical device 10, and light is taken out as parallel light.

Second Simulation

Figure 16:
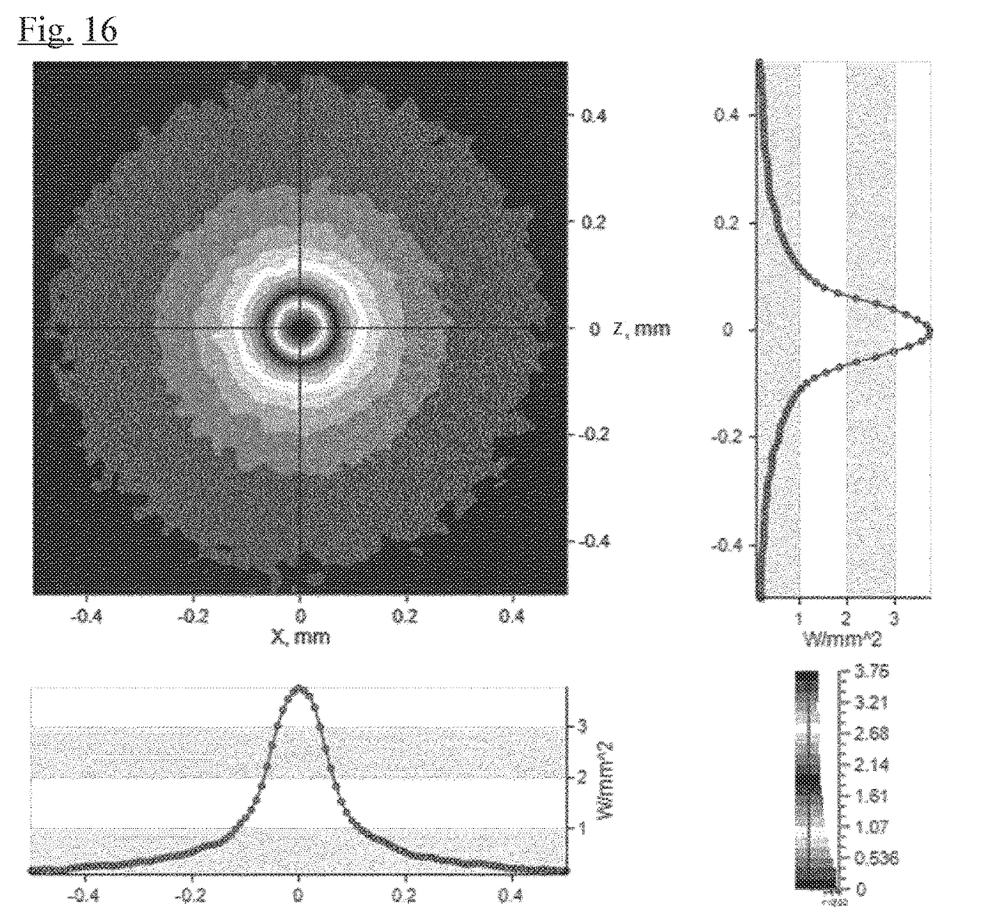
FIG. 16 is a diagram illustrating an illuminance distribution of another optical system apparatus according to the present disclosure.

Next, an illuminance distribution when light is controlled using the optical system apparatus illustrated FIG. 8 was simulated. In this case, the applied optical device 10A was a rotation body acquired by rotating the reference plane shape 1A illustrated in FIG. 14 as illustrated in FIG. 8, and emitted incident light from the predetermined site 9 as light concentrated to the predetermined light concentration site 95. A distance from the predetermined site 9 of the optical device 10 to the incidence portion 2 (radius OB) was set to be 7 mm. Moreover, a thickness of the optical device 10 (a distance between the x-axis and the point E) was set to be 30 mm. A radius of the optical device 10 (a distance between the y-axis and the point E) was set to be 34 mm. The assumed light source 8 placed at the predetermined site 9 had a diameter of 0.01 mm and emitted light in a lumber-cyanogen light distribution with an emission power of 1 W. The illuminance distribution at a location apart from the emit portion 3 by 500 mm was calculated. The simulation result is illustrated in FIG. 16. As is clear from FIG. 16, the light is well concentrated.

Third Simulation

Figure 17:
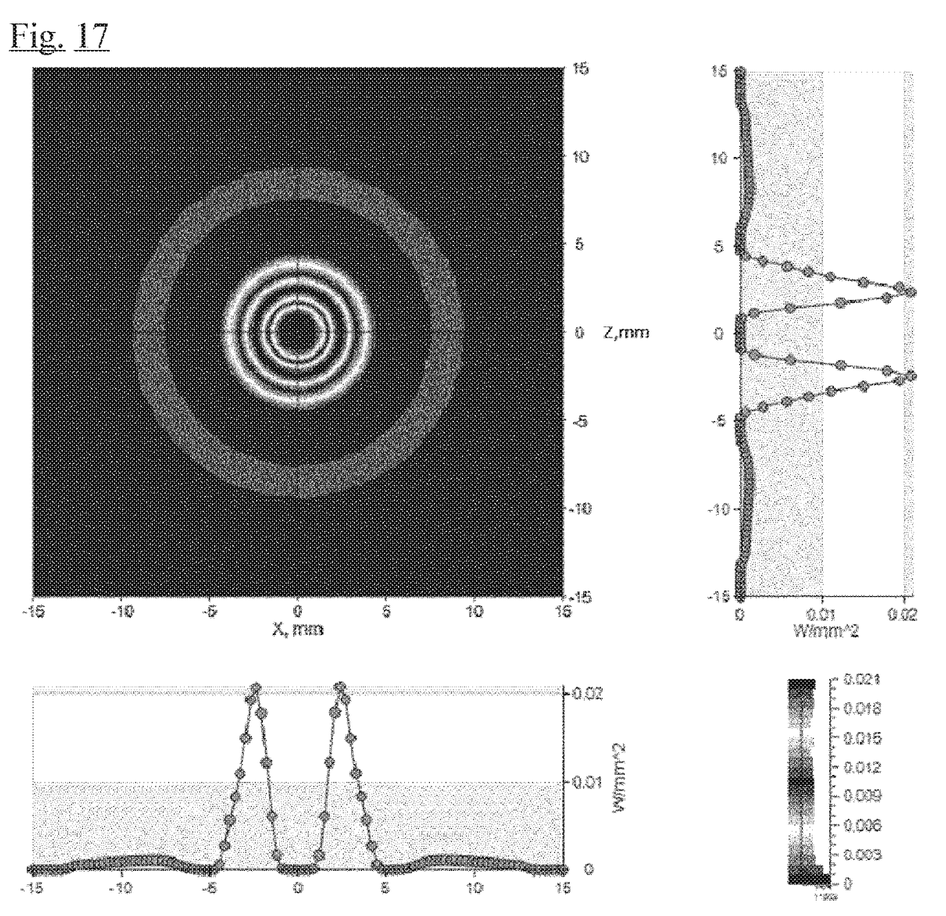
FIG. 17 is a diagram illustrating an illuminance distribution of the other optical system apparatus according to the present disclosure.

Next, an illuminance distribution when light is controlled using the optical system apparatus 200 illustrated FIG. 10 was simulated. In this case, the applied optical device 10A was a rotation body acquired by rotating the reference plane shape 1 illustrated in FIG. 11 as illustrated in FIG. 12, and emitted incident light from the predetermined site 9 as parallel light to the y-axis direction. A thickness of the optical device 10 (a distance between the x-axis and the point E) was set to be 11.2 mm. A radius of the optical device 10 (a distance between the y-axis and the point E) was set to be 12.9 mm. The assumed light source 8 placed at the predetermined site 9 had a diameter of 0.01 mm and emitted light in an isotropic light distribution with an emission power of 1 W and without Fresnel reflection due to embedding. The illuminance distribution at a location apart from the emit portion 3 by 50 mm was calculated. The simulation result is illustrated in FIG. 17. As is clear from FIG. 17, the illuminance distribution is substantially equivalent to the radius of the optical device 10, and light is taken out as parallel light. Moreover, since there is no Fresnel reflection at the incidence portion 2, it becomes clear that, in comparison with a non-embedded structure (the first simulation), the light use efficiency is improved by substantially 2%.

REFERENCE SIGNS LIST

1 Reference plane shape
1A Reference plane shape
2 Incidence portion
3 Emit portion
4 First reflection portion
5 Second reflection portion
6 Connection portion
8 Light source
9 Predetermined site
10 Optical device
42 First reflection portion
52 Second reflection portion
95 Light concentration site
100 Optical system apparatus
100A Optical system apparatus
200 Optical system apparatus

What is claimed is:

1. An optical device comprising:
at least a part of a rotation body obtained by rotating a reference plane shape around a center line passing through a predetermined site,
wherein the reference plane shape comprises
an incidence portion that is a circular arc around the predetermined site where light from the predetermined site is incident;
an emit portion that is a parabola having the predetermined site as a focal point and reflects the light which has traveled through the incidence portion and which is directly irradiated; and
a first reflection portion in a shape that reflects the reflected light by the emit portion toward the emit portion in such a way that an emit direction at the emit portion becomes parallel to a direction of the center line.

2. The optical device according to claim 1, wherein the first reflection portion is in a shape for performing total reflection on the light which has traveled through the incidence portion and which is reflected by the emit portion.

3. The optical device according to claim 1, wherein the first reflection portion utilizes metal reflection.

4. The optical device according to claim 1, wherein the reference plane shape further comprises a second reflection portion that reflects the light which has traveled through the incidence portion and which is directly irradiated to the emit portion.

5. The optical device according to claim 4, wherein the second reflection portion is in a shape that reflects the light in such a way that an emit direction at the emit portion becomes parallel to a direction of the center line.

6. The optical device according to claim 4, wherein the second reflection portion is in a shape for performing total reflection on the light which has traveled through the incidence portion.

7. The optical device according to claim 4, wherein the reflection by the second reflection portion utilizes metal reflection.

8. The optical device according to claim 4, wherein the reference plane shape further comprises a connection portion between the first reflection portion and the second reflection portion, and a joint portion to fasten the optical device at an arbitrary location is formed on at least a part of a surface formed by the connection portion.

9. The optical device according to claim 1, wherein a reflection prevention film is formed on either one of or both of a surface formed by the incidence portion and a surface formed by the emit portion.

10. An optical system apparatus comprising:
the optical device according to claim 1, and
a light source placed at the predetermined site.

11. The optical system apparatus according to claim 10, wherein the light source is embedded in the incidence portion.

12. An optical system apparatus comprising:
the optical device according to claim 1; and
a light source placed at the predetermined site,
wherein a radius of the circular arc is equal to or greater than four times as much as a maximum radius of the light source.

13. The optical system apparatus according to claim 10, wherein a mirror is placed at a side of the light source facing with the optical device.

14. The optical system apparatus according to claim 10, wherein the mirror is formed in a spherical shape that reflects incident light from the light source to an incidence direction.

* * * * *